US008008789B2

(12) United States Patent
Noda et al.

(10) Patent No.: US 8,008,789 B2
(45) Date of Patent: Aug. 30, 2011

(54) SUBSTRATE FOR A DISPLAY PANEL, AND A DISPLAY PANEL HAVING THE SAME

(75) Inventors: Tomoki Noda, Tsu (JP); Masanori Takeuchi, Tsu (JP); Kenji Enda, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/981,699

(22) Filed: Dec. 30, 2010

(65) Prior Publication Data

US 2011/0096284 A1 Apr. 28, 2011

Related U.S. Application Data

(63) Continuation of application No. 12/067,518, filed as application No. PCT/JP2006/318331 on Sep. 15, 2006.

(30) Foreign Application Priority Data

Sep. 22, 2005 (JP) ................................. 2005-275640

(51) Int. Cl.
*H01L 23/544* (2006.01)
*H01L 21/76* (2006.01)
*H01L 29/04* (2006.01)
*H01L 31/00* (2006.01)

(52) U.S. Cl. .................. 257/797; 257/61; 257/E23.179; 428/195.1; 438/401

(58) Field of Classification Search .................. 257/797, 257/E23.179; 428/195.1; 438/401
See application file for complete search history.

(56) References Cited

U.S. PATENT DOCUMENTS

| 5,936,695 | A | * | 8/1999 | Hida et al. | 349/153 |
|---|---|---|---|---|---|
| 6,204,895 | B1 | * | 3/2001 | Nakamura et al. | 349/5 |
| 6,947,106 | B2 | * | 9/2005 | Chang et al. | 349/106 |
| 6,958,802 | B2 | * | 10/2005 | Watamura | 349/192 |
| 7,042,532 | B2 | * | 5/2006 | Watamura | 349/54 |
| 7,319,239 | B2 | | 1/2008 | Tsubata et al. | |
| 7,511,304 | B2 | | 3/2009 | Tsubata et al. | |
| 7,515,243 | B2 | * | 4/2009 | Watamura | 349/192 |
| 7,732,820 | B2 | | 6/2010 | Tsubata et al. | |
| 2002/0075442 | A1 | * | 6/2002 | Yanagawa et al. | 349/155 |
| 2003/0146475 | A1 | * | 8/2003 | Lai | 257/359 |
| 2003/0201440 | A1 | * | 10/2003 | Satou et al. | 257/59 |
| 2003/0224550 | A1 | * | 12/2003 | Kokubo et al. | 438/48 |
| 2004/0016925 | A1 | * | 1/2004 | Watamura | 257/59 |
| 2004/0085506 | A1 | * | 5/2004 | Yanagawa et al. | 349/153 |
| 2004/0195704 | A1 | * | 10/2004 | Nakata et al. | 257/797 |
| 2006/0103412 | A1 | * | 5/2006 | Kimura et al. | 324/770 |
| 2006/0290841 | A1 | * | 12/2006 | Kwon et al. | 349/110 |

OTHER PUBLICATIONS

Noda et al.; "Substrate for a Display Panel, and a Display Panel Having the Same"; U.S. Appl. No. 12/067,518, filed Apr. 4, 2008.

* cited by examiner

*Primary Examiner* — Zandra Smith
*Assistant Examiner* — Jeremy Joy
(74) *Attorney, Agent, or Firm* — Keating & Bennett, LLP

(57) ABSTRACT

A substrate for a display panel includes an alignment accuracy measurement mark which is used for measuring alignment accuracy between patterns on the substrate without decreasing an aperture ratio of a pixel. The substrate for a display panel includes the alignment accuracy measurement mark in an isolated configuration which is used for measuring alignment accuracy between a pattern of a gate signal line and an auxiliary capacitance line and a pattern of a source signal line and a drain line, where the alignment accuracy measurement mark has a shape such that at least one straight line portion is included, is formed in a layer where the pattern of the source signal line and the drain line is formed, and is positioned on the gate signal line.

8 Claims, 3 Drawing Sheets

US 8,008,789 B2

SUBSTRATE FOR A DISPLAY PANEL, AND A DISPLAY PANEL HAVING THE SAME

BACKGROUND OF THE INVENTION

1. Field of the Invention

The present invention relates to a substrate for a display panel, and a display panel having the substrate, and specifically relates to a substrate for a liquid crystal display panel which includes layers including patterns on a conductive film and an insulating film, and a liquid crystal display panel having the substrate.

2. Description of the Related Art

A common liquid crystal display panel includes an array substrate and a color filter substrate, and a space therebetween is filled with a liquid crystal. On surfaces of the array substrate and the color filter substrate, layers including patterns on a conductive film and an insulating film are stacked.

FIG. 3 is a schematic plan view showing one example of patterns of lines which are formed on a conventional liquid crystal display panel 9, and the lines for one pixel are shown. An array substrate includes a layer where a pattern of a gate signal line 912 and an auxiliary capacitance line 915 is formed and a layer where a pattern of a source signal line 913 and a drain line 914 is formed, and these layers are stacked via an insulating film (not shown). By these patterns, thin film transistors and predetermined lines are formed.

In order that the thin film transistor and the predetermined lines may have properties as designed, alignment of the pattern of the gate signal line 912 and the auxiliary capacitance line 915 with the pattern of the source signal line 913 and the drain line 914 is required to be performed with predetermined accuracy in forming the patterns. For this reason, after the pattern of the gate signal line 912 and the auxiliary capacitance line 915 and the pattern of the source signal line 913 and the drain line 914 are formed, alignment accuracy between the patterns is measured. If the measured alignment accuracy is out of a predetermined permissible range, the source signal line 913 and the drain line 914 are re-formed.

The measurement of the alignment accuracy is performed using image recognition. Accordingly, a mark or a line for measurement which is used for image recognition is sometimes formed in the source signal line 913 and the drain line 914. For example, in FIG. 3, a linear section 914a extending in an X-axis direction is formed in the drain line 914. Edges of the linear section 914a and edges of the gate signal line 912 are detected using image recognition, and based on a result of the detection, a positional relationship between the linear section 914a and the gate signal line 912 in a Y-axis direction (e.g., a distance D between a centerline C of the gate signal line 912 and a centerline B of the linear section 914a of the drain line 914) is measured.

As a prior art literature relating to the present invention, Japanese Patent Application Unexamined Publication No. 2003-302654 is cited.

Incidentally, a liquid crystal panel is required to increase an aperture ratio of each pixel in order to increase luminance. Accordingly, as shown in FIG. 3, in a case where structural elements 921a to 921e arranged to control alignment of the liquid crystal are provided on a common substrate, the drain line 914 is sometimes arranged to coincide with one of the structural elements 921a to 921e as exact as possible. However, it is difficult to arrange the linear section 914a extending in the X-axis direction to coincide with the structural elements 921a to 921e, so that some sections of the drain line 914 do not coincide with the structural elements 921a to 921e. As a result, the sections which do not coincide with the structural elements 921a to 921e cause a decrease in an aperture ratio of a pixel.

Therefore, it is preferable to decrease the area of the sections of the drain line 914 which do not coincide with the structural elements 921a to 921e as much as possible in order to increase the aperture ratio. However, the linear section 914a is required to have a certain length such that the edges of the linear section 914a can be detected with predetermined accuracy in image recognition. In addition, the widths of the sections of the drain line 914 which do not coincide with the structural elements 921a to 921e cannot be narrowed because narrowing the widths of the sections of the drain line 914 which do not coincide with the structural elements 921a to 921e decreases a process margin for the drain line 914, which may cause a reduction in yields.

SUMMARY OF THE INVENTION

In order to overcome the problems described above, preferred embodiments of the present invention provide a substrate for a display panel such that alignment accuracy measurement can be performed while improving an aperture ratio of a pixel and the improvement of the aperture ratio of the pixel is made without decreasing a process margin, and provide a display panel having the substrate.

According to a preferred embodiment of the present invention, a substrate for a display panel includes a mark for alignment accuracy measurement in an isolated configuration, which is used for measuring alignment accuracy between a first conductor pattern and a second conductor pattern. Besides, "in an isolated configuration" means that the alignment accuracy measurement mark is not configured nor intended to be electrically connected with a conductive element which forms the first conductor pattern or the second conductor pattern. In addition, the alignment accuracy measurement mark may be arranged not to have or not to be intended to have an electrical or electronic function in relation to the first conductor pattern or the second conductor pattern.

The alignment accuracy measurement mark is formed preferably in a layer where the first conductor pattern is formed or a layer where the second conductor pattern is formed. The alignment accuracy measurement mark is preferably placed at a position such that an aperture ratio of a pixel is not decreased by the alignment accuracy measurement mark. For example, when the alignment accuracy measurement mark is formed in the layer where the second conductor pattern is formed, the alignment accuracy measurement mark is at least partially positioned on the first conductor pattern.

It is preferable that the alignment accuracy measurement mark has a shape such that its position can be detected with accuracy when image recognition is made. For example, the alignment accuracy measurement mark is given a shape such that at least one straight line portion is included.

Besides, for the first conductor pattern, a pattern of a gate signal line is preferably used, and for the second conductor pattern, a pattern of a source signal line and a drain line is preferably used.

According to various preferred embodiments of the present invention, alignment accuracy between the first conductor pattern (e.g., the pattern of the gate signal line) and the second conductor pattern (e.g., the pattern of the source signal line and the drain line) can be measured using the alignment accuracy measurement mark in the isolated configuration. As a result, the need to form the second conductor pattern so as to include a linear section for alignment accuracy measurement is eliminated and the degree of design freedom for the second conduct or pattern is increased, allowing the second conductor pattern to be designed so as to coincide with light shield elements provided on a common substrate as exact as possible, whereby the aperture ratio of the pixel can be improved.

In addition, the need to narrow the widths of the lines in the first conductor pattern or the second conductor pattern in order to improve the aperture ratio of the pixel is eliminated, so that the aperture ratio of the pixel can be improved without decreasing a process margin. Further, by the improvement in the aperture ratio, a backlight is decreased in cost.

If the alignment accuracy measurement mark is at least partially positioned on the first conductor pattern or the second conductor pattern, the alignment accuracy measurement mark does not decrease the aperture ratio of the pixel.

In addition, if the alignment accuracy measurement mark has a shape such that at least one straight line portion is included, the position of the alignment accuracy measurement mark can be detected with accuracy by detecting an edge at the straight line portion using image recognition.

By including the above-described substrate, a display panel having a higher aperture ratio of each pixel, and higher luminance can be obtained.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A detailed description of a substrate for a display panel according to preferred embodiments of the present invention will now be given with reference to the accompanying drawings. In the following preferred embodiments, a case where an array substrate for a liquid crystal display panel is used for the substrate for a display panel is described.

Figure 1A:
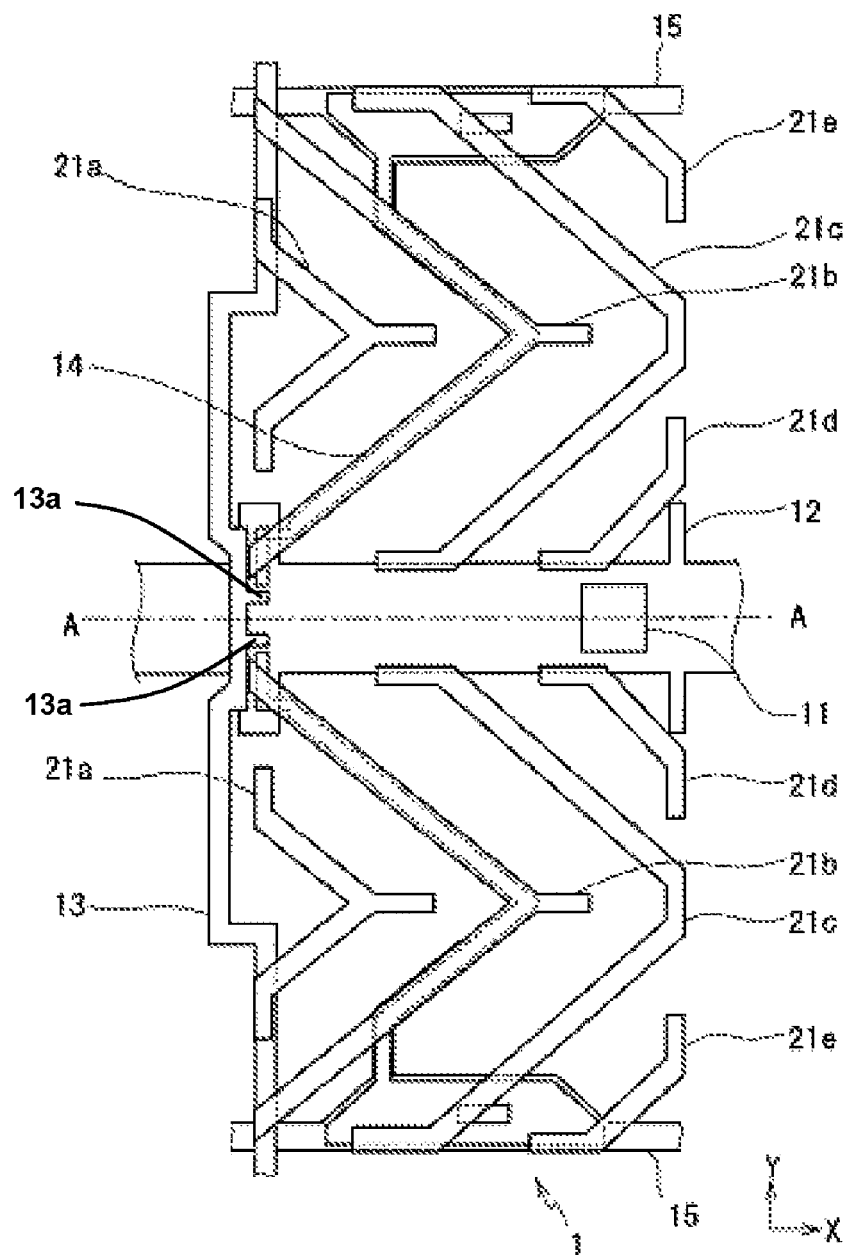
FIG. 1A is a schematic plan view showing a configuration of a pixel formed on a substrate for a display panel according to a preferred embodiment of the present invention.
Figure 1B:
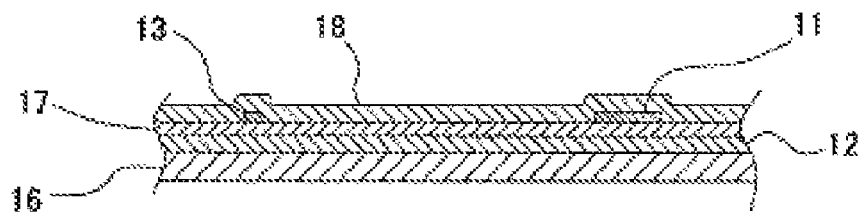
FIG. 1B is a cross-sectional view showing the same along the line A-A of FIG. 1A.

FIG. 1A is a schematic plan view showing a configuration of a pixel formed on the substrate for a display panel according to a preferred embodiment of the present invention, and FIG. 1B is a cross-sectional view showing the same along the line A-A of FIG. 1A. As shown in FIGS. 1A and 1B, a substrate 1 for a display panel according to a preferred embodiment of the present invention includes a transparent substrate 16 such as a glass substrate, a layer including a gate signal line 12 and an auxiliary capacitance line 15, a first insulating layer 17, a layer including a source signal line 13 and a drain line 14, and a second insulating layer 18, where the layer including the gate signal line 12 and the auxiliary capacitance line 15, the first insulating layer 17, the layer including the source signal line 13 and the drain line 14, and the second insulating layer 18 are stacked on a surface of the transparent substrate 16. The source signal line 13 includes branch portions 13a. In addition, the substrate 1 includes a mark 11 for alignment accuracy measurement in an isolated configuration, which is positioned preferably on the gate signal line 12. Meanwhile, convex structural elements 21a to 21e which are arranged to control alignment of a liquid crystal are provided on a common substrate (e.g., a color filter substrate). Hereinafter, such structural elements are referred to as "alignment control structural elements".

The gate signal line 12 and the auxiliary capacitance line 15 are preferably made of the same material using the same process and formed in the same layer. On a surface of the layer, the insulating layer 17 is formed. Further, on a surface of the insulating layer 17, the source signal line 13 and the drain line 14 made of the same material under the same process are formed in the same layer. Thus, the layer including a pattern of the gate signal line 12 and the auxiliary capacitance line 15, and the layer including a pattern of the source signal line 13 and the drain line 14 are stacked via the insulating layer 17. For configurations, materials and formation methods of the gate signal line 12, the auxiliary capacitance line 15, the source signal line 13 and the drain line 14, conventional configurations, materials and formation methods can be used, so that explanations thereof are omitted.

The alignment accuracy measurement mark 11 is used for measuring a relative position between the pattern of the source signal line 13 and the drain line 14 and the pattern of the gate signal line 12. The alignment accuracy measurement mark 11 is preferably made of the same material under the same process as the source signal line 13 and the drain line 14 during the process of forming the source signal line 13 and the drain line 14, and is preferably formed in the layer where the source signal line 13 and the drain line 14 are formed. Accordingly, a relative positional relationship between the alignment accuracy measurement mark 11, and the pattern of the source signal line 13 and the drain line 14 is fixed.

The alignment accuracy measurement mark 11 is not configured nor intended to be electrically connected with any of the gate signal line 12, the auxiliary capacitance line 15, the source signal line 13 and the drain line 14. In other words, the alignment accuracy measurement mark 11 does not have or is not intended to have an electrical or electronic function in relation to the lines 12, 13, 14 and 15. More specifically, the alignment accuracy measurement mark 11 is not intended to have any contribution to nor any influence on driving of a thin film transistor.

The alignment accuracy measurement mark 11 is arranged to have a shape such that an edge thereof can be detected using image recognition and the position of the alignment accuracy measurement mark 11 can be calculated based on the detected edge. For example, the shape of the alignment accuracy measurement mark 11 preferably is a quadrilateral such as a square as shown in FIG. 1A and a rectangle. When the alignment accuracy measurement mark 11 has a shape such that opposed sides are included, e.g., a quadrilateral, edges at the opposed sides are detected and a centerline thereof can be accordingly calculated, allowing position measurement of the alignment accuracy measurement mark 11 with high accuracy.

The shape of the alignment accuracy measurement mark 11 is not limited to a quadrilateral, and the alignment accuracy measurement mark 11 may have a shape such that at least one straight line portion is included. In this case, it is preferable that the straight line portion of the alignment accuracy measurement mark 11 is arranged to extend in an X-axis direction when the alignment accuracy measurement mark 11 is intended for alignment accuracy measurement in a Y-axis direction. Meanwhile, it is preferable that the straight line portion of the alignment accuracy measurement mark 11 is arranged to extend in the Y-axis direction when the alignment accuracy measurement mark 11 is intended for alignment accuracy measurement in the X-axis direction. When the alignment accuracy measurement mark 11 has such a shape, the position thereof in the intended axis direction can be measured by detecting an edge at the straight line portion.

Next, a manner of alignment accuracy measurement between the pattern of the source signal line 13 and the drain line 14 and the pattern of the gate signal line 12 using the alignment accuracy measurement mark 11 will be described. The description is given to the case of the alignment accuracy measurement in the Y-axis direction.

After the gate signal line 12 and the auxiliary capacitance line 15, the first insulating layer 17, the source signal line 13 and the drain line 14, the alignment accuracy measurement mark 11, and the second insulating layer 18 are formed on the transparent substrate 16, a region including the alignment accuracy measurement mark 11 is photographed. Here, the edges of the gate signal line 12 on which the alignment accuracy measurement mark 11 is positioned are brought into view. Then, the edges of the alignment accuracy measurement mark 11 which are parallel to the X-axis direction, and the edges of the gate signal line 12 which are parallel to the X-axis direction are detected using image recognition. Based on the detected edges, the position of a centerline of the alignment accuracy measurement mark 11 and the position of a centerline of the gate signal line 12 are calculated (in FIGS. 1A and 1B, a state where the centerline of the alignment accuracy measurement mark 11 coincides with the centerline of the gate signal line 12 is shown, and the line A-A indicates a centerline common to both of the centerlines in such a state). Then, based on the calculated centerlines, a relative positional relationship in the Y-axis direction between the alignment accuracy measurement mark 11 and the gate signal line 12 is calculated. Accordingly, the alignment accuracy measurement in the Y-axis direction between the pattern of the gate signal line 12 and the pattern of the source signal line 13 and the drain line 14 can be performed.

If the calculated relative positional relationship falls within a permissible range, the next process is started. If the relative positional relationship is out of the permissible range, the source signal line 13 and the drain line 14 are re-formed. Besides, for a method of image recognition and an apparatus for image recognition, a variety of conventional methods and apparatuses can be used, so that explanations thereof are omitted.

Arranging the alignment accuracy measurement to be performed using the alignment accuracy measurement mark 11 as described above eliminates a necessity to form the drain line 14 so as to have a linear section for alignment accuracy measurement, so that the degree of design freedom for the drain line 14 increases, allowing the drain line 14 to be designed so as to coincide substantially over the entire length with any one of the alignment control structural elements 21a to 21e of the common substrate, whereby an aperture ratio of an pixel can be improved. In addition, a necessity to narrow the width of the drain line 14 in order not to decrease the aperture ratio of the pixel is eliminated, so that a process margin does not have to be decreased. Further, the alignment accuracy measurement mark 11 does not decrease the aperture ratio of the pixel because it is positioned on the gate signal line 12. In addition, the alignment accuracy measurement mark 11 has no influence on driving of the pixel because it is in the isolated configuration.

While a preferred embodiment of the present invention has been described above, it is to be understood that variations and modifications will be apparent to those skilled in the art without departing the scope and spirit of the present invention.

In the above-described preferred embodiment of the present invention, the case where the shape of the alignment accuracy measurement mark 11 preferably is a square is described. However, the shape of the alignment accuracy measurement mark 11 is not limited to a square. It is essential only for the alignment accuracy measurement mark 11 to have a shape such that the edges thereof can be detected using image recognition and the position of the alignment accuracy measurement mark 11 can be calculated based on the detected edges.

Figure 2:
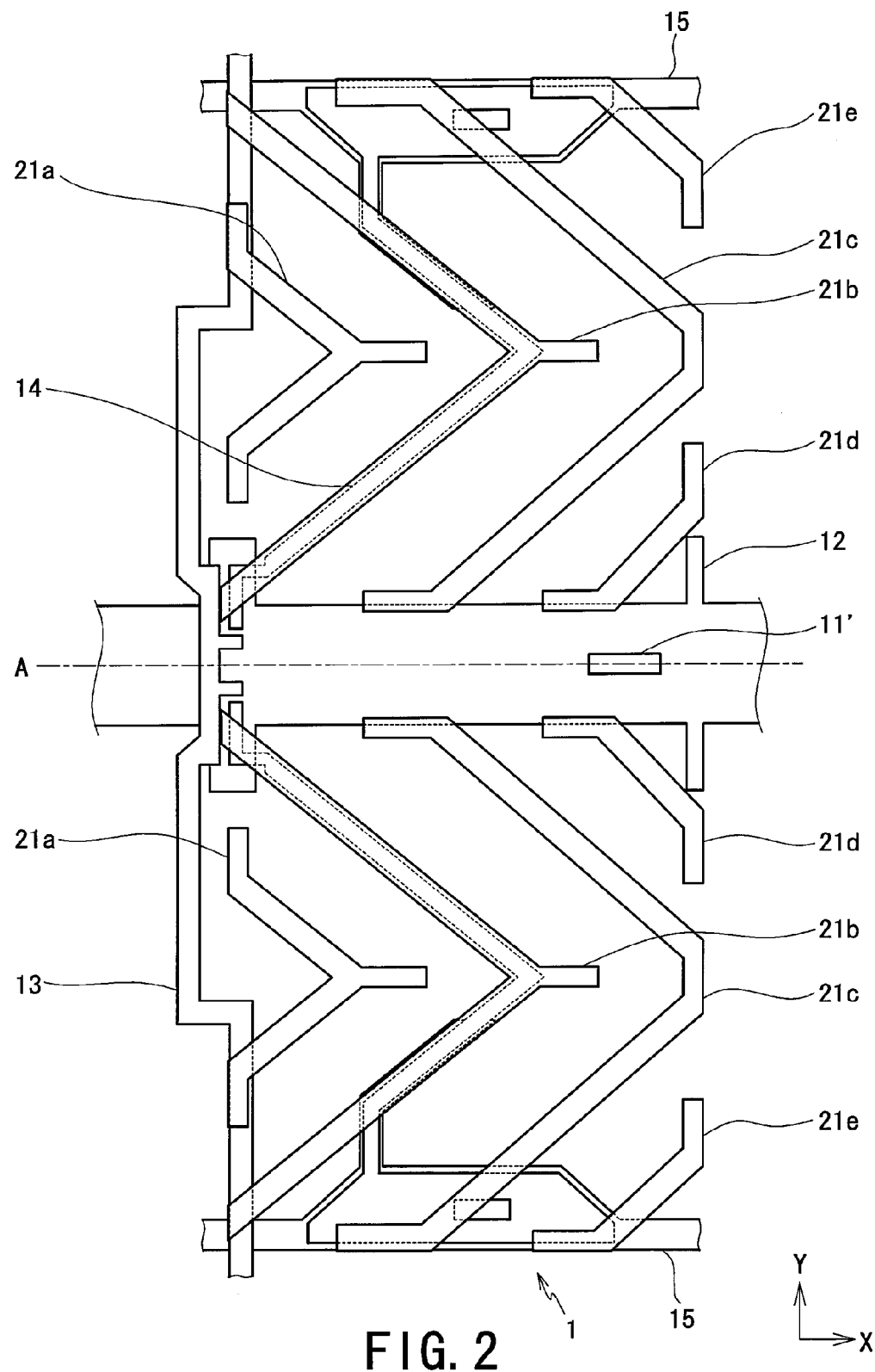
FIG. 2 is a schematic plan view showing a configuration of a pixel formed on a substrate for a display panel according to another preferred embodiment of the present invention.
Figure 3:
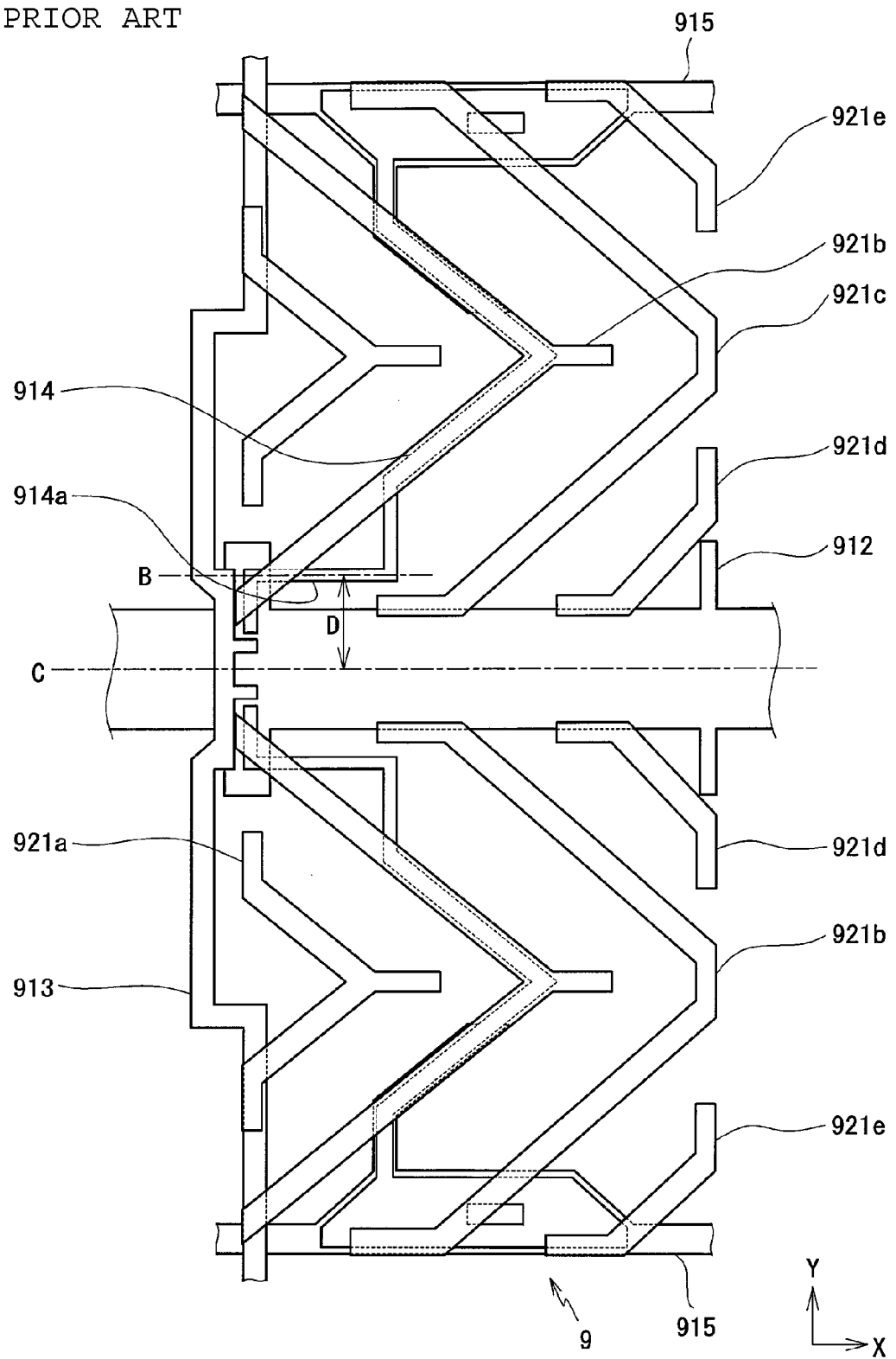
FIG. 3 is a schematic plan view showing a configuration of a pixel formed on a conventional substrate for a display panel.

FIG. 2 is a view of a modified example of the substrate for a display panel according to the above-described preferred embodiment of the present invention. As shown in FIG. 2, an alignment accuracy measurement mark 11' preferably has the shape of a rectangle. When the alignment accuracy measurement mark 11' is used for alignment accuracy measurement in the Y-axis direction, the edges of the alignment accuracy measurement mark 11' which are parallel to the X-axis direction are arranged to have lengths such that they can be detected with predetermined accuracy using image recognition. Meanwhile, the lengths of the edges of the alignment accuracy measurement mark 11' which are parallel to the Y-axis direction are not specifically limited. Accordingly, it is also preferable that the alignment accuracy measurement mark 11' has the shape of a rectangle which is long in the Y-direction other than a rectangle which is long in the X-direction as shown in FIG. 2.

It is also preferable that the alignment accuracy measurement mark has the shape of a triangle or other polygons. In addition to the shapes having a straight line portion included therein, it is preferable that the alignment accuracy measurement mark has a shape such that a curved line portion is included. For example, if the alignment accuracy measurement mark has a shape such that a segment of a circle is included, the center of the segment of the circle can be calculated based on an edge detected at the segment. Accordingly, it is also preferable that the alignment accuracy measurement mark has the shape of a circle, a semicircle, or a sector.

It is essential only for the alignment accuracy measurement mark to be placed at a position such that a relative positional relationship with the gate signal line can be measured. For example, in a case where the gate signal line and the auxiliary capacitance line are simultaneously formed (in other words, a relative positional relationship between the gate signal line and the auxiliary capacitance line is fixed) as in the preferred embodiments of the present invention, it is also preferable that the alignment accuracy measurement mark is positioned on the auxiliary capacitance line. The alignment accuracy measurement mark is not necessarily required to be positioned on the gate signal line or the auxiliary capacitance line. For example, it is also preferable that the alignment accuracy measurement mark is positioned in the vicinity of the gate signal line or the auxiliary capacitance line. However, in order not to decrease the aperture ratio of the pixel, the alignment accuracy measurement mark is preferably placed out of the region of the pixel.

The alignment accuracy measurement mark is not necessarily required to be formed in the layer where the source signal line and the drain line are formed. In addition, although the alignment accuracy measurement mark is entirely positioned on the gate signal line in the above-described preferred embodiments of the present invention, it is not limited to being positioned as such and is preferably partially positioned on the gate signal line.

Incidentally, the description has been given to the case where the alignment accuracy measurement mark is used for the alignment accuracy measurement in the Y-axis direction in the above-described preferred embodiments of the present invention. However, it is also preferable that the alignment accuracy measurement mark is used for the alignment accuracy measurement in the X-axis direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A substrate for a display panel comprising:
   a first layer including a first conductor pattern defining a gate signal line;
   a second layer including a second conductor pattern defining a source signal line, the source signal line including at least one branch portion that extends in at least one direction in which the gate signal line extends;
   an insulating layer arranged such that the first layer and the second layer are stacked with the insulating layer disposed therebetween on a surface of the substrate; and
   an isolated pattern that is included in the second layer and is electrically isolated from the source signal line; wherein
   the isolated pattern is spaced from the at least one branch portion of the source signal line along the at least one direction and is at least partially positioned above the gate signal line; and the isolated pattern has a shape that includes a curved line portion.

2. The substrate for a display panel according to claim 1, wherein all edges of the isolated pattern are located within a periphery of the gate signal line.

3. The substrate for a display panel according to claim 1, wherein the isolated pattern is arranged to be used to measure alignment accuracy between the first conductor pattern and the second conductor pattern.

4. The substrate for a display panel according to claim 1, wherein the isolated pattern is electrically isolated from all other elements on the substrate.

5. The substrate for a display panel according to claim 1, wherein the isolated pattern is made of a material used to form the source signal line.

6. A display panel comprising the substrate for a display panel according to claim 1.

7. The substrate for a display panel according to claim 1, wherein the shape of the isolated pattern is one of a circle or a semi-circle.

8. The substrate for a display panel according to claim 1, wherein the isolated pattern has a shape such that at least one straight line portion is included.

* * * * *